United States Patent Office 3,223,537
Patented Dec. 14, 1965

3,223,537
METHOD FOR PREPARING FOAMED
INSULATING MATERIAL
Robert E. Wiegert, Middletown, and Thomas J. Byrne, Franklin, Ohio, assignors to Aeronca Manufacturing Corporation, Middletown, Ohio, a corporation of Ohio
No Drawing. Filed Jan. 15, 1962, Ser. No. 166,359
10 Claims. (Cl. 106—40)

This invention relates to foamed or cellular insulating materials principally constituted by alumina and aluminum phosphate.

A principal objective of this invention has been to provide a foamed insulating material especially adapted for use as a heat shield at temperatures up to about 3400° F., and which is characterized by a very low density and thermal conductivity.

The development of re-entry vehicles, that is, vehicles which can re-enter the earth's atmosphere from space at very high speeds and land safely, has presented a need for heat shielding materials to protect the vehicle, or certain critical portions of it, from the extremely high temperatures generated by the severe aerodynamic heating which accompanies re-entry. Temperatures as high as 3400° F. or higher may be encountered. In addition to this, the criticality of the weight factor in space vehicle design calls for insulating materials of very low density and low thermal conductivity.

Foamed alumina and aluminum phosphate insulating materials are known, but past materials of this type have been very heavy per unit volume and have displayed relatively high thermal conductivities. For those reasons such past materials have been unsuitable as heat shields for re-entry vehicles. In contrast to previous aluminum-containing foamed insulating materials, compositions produced in accordance with the present invention are characterized by densities in the range of about 20 to 58 pounds per cubic foot and thermal conductivities in the range of about 2.0 to 3.0 B.t.u. per hour per square foot per ° F. per inch of thickness at temperatures in the 2500–2900° F. range.

Foamed insulating material in accordance with this invention is produced by reacting a mixture of alumina ($Al_2O_3$), aluminum hydroxide ($Al(OH)_3$), phosphoric acid ($H_3PO_4$), powdered aluminum metal and water. The relative proportions between these components necessary to provide the desired low density-low conductivity characteristics in the final product fall in a rather critically limited range.

We have empirically discovered and determined that a mixture of aluminum hydroxide and alumina can be reacted to produce a product which is of adequate physical strength but which is much lighter and less conductive than the product which is produced if alumina is used in the reaction by itself. Moreover, we have found that the use of a mixture of alumina and aluminum hydroxide in the reaction with phosphoric acid affords a much greater degree of control over the final product than is possible where either aluminum hydroxide or alumina is used singly.

Simply put, in the practice of this invention, alumina, aluminum hydroxide and finely powdered aluminum metal are mixed as a dry powder in proportions to be specified. This mixture is reacted under controlled conditions with phosphoric acid and water and is cast in a mold to produce a light cellular body which is then hardened or cured at elevated temperature.

Several different types of reactions take place when the phosphoric acid is added to the powdered mixture. In overall terms, the phosphoric acid reacts with the alumina to form aluminum phosphate and water:

$$2H_3PO_4 + Al_2O_3 \rightarrow 2AlPO_4 + 3H_2O$$

The heat of the reaction, which is exothermic, vaporizes the water and forms steam which is partly responsible for the foaming that thereupon takes place. The phosphoric acid reacts with the aluminum hydroxide to produce additional aluminum phosphate and water:

$$H_3PO_4 + Al(OH)_3 \rightarrow AlPO_4 + 3H_2O$$

The metallic aluminum also reacts with the acid to produce the phosphate and water:

$$2H_3PO_4 + 2Al \rightarrow 2AlPO_4 + 3H_2$$

The gaseous hydrogen which is released contributes to the foaming action with the steam. The steam and hydrogen impart a light, cellular structure to the material. The heat released by the reaction drives off excess water and sets the product, and the cellular structure is thereby preserved. The reacted mass is an integral, substantially homogeneous composite of excess or unreacted alumina and aluminum phosphate and is permeated by a large number of very small pores or cells. The final curing step hardens the reacted mass and improves its physical strength.

As previously stated, the proportions of the components of the reaction mixture are rather critical for obtaining the desired properties. Alumina in powdered form, preferably of about 325 mesh size, is utilized in the amount of about 25–31 parts by weight. The hydroxide, in powdered form and preferably also of about 325 mesh size, is present in the amount of about 30–40 parts. Metallic aluminum in finely divided form is added in the amount of about 0.01–0.1 part. Other hydrogen displacing metals such as zinc may be substituted for aluminum.

The dry mixture is wetted with about 8–14 parts of water, and the reaction is initiated by the addition of phosphoric acid. The phosphoric acid is preferably in 85% aqueous solution and is added in the amount of about 22–27 parts, but other equivalent concentrations may be used.

Alumina tends to react slowly with phosphoric acid, and in the absence of the hydroxide the foaming would be very slow and irregular, and the degree of cell formation would be relatively small. We have found, however, that the incorporation of the hydroxide to the alumina greatly increases the rate of reaction with phosphoric acid. Also the use of the hydroxide improves the strength of the product and apparently reduces drying shrinkage. More importantly, the alumina-hydroxide mixture reacts in a much more controllable manner, whereby the degree of cell formation, and therefore the density of the product, can readily be adjusted and controlled. In general, aluminum hydroxide alone, in the absence of alumina, would react at a rate far too fast to be of practical utility. Through the use of a mixture of both the oxide and the hydroxide, we have found that the reaction can be caused to take place at a rapid but controllable rate whereby a much lighter, less conductive material is produced.

When the phosphoric acid is added to the mixture of dry powders, foaming begins almost immediately, and if the mixture is not disturbed or agitated while foaming occurs, the product will be very highly foamed. Agitation of the reaction mixture, i.e., stirring, mixing or other handling during hardening, tends to destroy the cells and has the general effect of increasing the density and conductivity of the product. The foaming reaction is usually largely completed within a few minutes.

The foamed structure requires curing at controlled conditions to impart better strength and rigidity to it. One of the important advantages of the present invention is that curing is effected relatively quickly without the use of very high temperatures or long drying times. In general, curing has an effect on the density of the final product such that the lower the curing temperature and/or the shorter the curing time, the more completely the foamed character of the reaction product is preserved. We have established that excellent characteristics are imparted to the product by curing the set, initially reacted mass in a furnace at 200° F. for about two hours and then at 400° F. for about two hours. It is contemplated, however, that other cure cycles can be used, including shorter or longer times and somewhat different temperatures.

Following are specific examples of various compositions which can be used to produce the product of this invention:

Example I

| Composition: | | Cure cycle, °F.: | Hrs. |
|---|---|---|---|
| $Al_2O_3$ | 30.5 | 200 | 2 |
| $Al(OH)_3$ | 30.5 | 400 | 2 |
| $H_3PO_4$ | 25.6 | | |
| $H_2O$ | 12.2 | | |
| Al | 0.01 | | |

Example II

| Composition: | | Cure cycle, °F.: | Hrs. |
|---|---|---|---|
| $Al_2O_3$ | 25.9 | 200 | 2 |
| $Al(OH)_3$ | 38.8 | 400 | 2 |
| $H_3PO_4$ | 24.4 | | |
| $H_2O$ | 9.7 | | |
| Al | 0.01 | | |

Example III

| Composition: | | Cure cycle, °F.: | Hrs. |
|---|---|---|---|
| $Al_2O_3$ | 25.0 | 200 | 2 |
| $Al(OH)_3$ | 37.5 | 400 | 2 |
| $H_3PO_4$ | 23.8 | | |
| $H_2O$ | 12.5 | | |
| Al | .01 | | |

In each of the foregoing examples, curing was done in two steps, first at about 200° F. for two hours, and then at 400° F. for two hours. In other tests, curing has been effected in a three-step cycle including an initial phase at 200° F. for four hours, an intermediate phase at 400° F. for 16 hours, and a final phase at 600° F. for 12 hours. Alternatively, suitable curing has been effected by gradually raising the temperature of the mass from 200° F. to 600° F. over a period of about 20 hours, and then holding the material at 600° F. for about 12 hours. In any event, very long drying times at room temperature such as were required in past process are entirely unnecessary and are in fact undesirable.

It should be noted that the curing times given were used in the production of blocks up to 1″ x 6″ x 6″ in size. The production of insulating materials in larger sizes may and probably will require some variation in cure cycle for best results.

The density of the product can most easily and accurately be controlled within the approximate 20–60 pounds per cubic foot range by varying the length of the initial curing phase and by varying the quantity of powdered aluminum which is incorporated in the initial mixture. The precise density of the product depends upon many process variables not all of which can be specified accurately, including the manner in which the phosphoric acid is mixed with the dry powdered materials, atmospheric conditions, and the shape of the form in which the material is cast. In general, however, shorter cure times, particularly in the initial part of the curing process, minimize density. Higher contents of metallic aluminum, within the specified range, effect greater evolution of gas and thereby increase foaming.

As previously mentioned, the foaming reaction begins almost immediately upon the addition of phosphoric acid to the wetted powder. Once the reaction has been initiated, handling or mixing of the reaction mass before it has set tends to destroy the gaseous bubbles which form, and re-reacting mixture should therefore be cast or allowed to harden with a minimum of handling. The material may be poured into the form in which it is to harden while foaming is taking place, and should be enclosed or kept under restraint until the 200° F. phase of the cure cycle is completed. Curing should then be continued, in accordance with the general procedure described.

One particular purpose for which the lightweight foamed insulating material of this invention is especially suited is in application to honeycomb composite metal structures of the type which are used in the fabrication of high strength-to-weight aerodynamic components. For this purpose, the reaction mass is poured into or is otherwise applied to the honeycomb structure, preferably into the individual cells thereof, while the reaction is taking place. Restraints are applied until the composition sets. The resultant structure is extremely strong and is highly heat resistant. It will be appreciated however, that the composition of this invention is not limited to such use alone, and that this illustration is given only by way of example.

Where, as in the example just given, the insulation is to be applied to a metal form which might be attacked by residual oxidizing gases during curing in vacuo, it is desirable to include in the reaction mass a small quantity of an absorbent material, such as activated carbon in the proportion of about 1–1.5 parts by weight. This material takes no part in the foaming reaction but absorbs remaining small amounts of gaseous products which might otherwise attack a honeycomb or other structure during the curing and application phases.

What is claimed is:

1. The method which comprises, forming a mixture consisting essentially of about 25–31 parts by weight granular alumina ($Al_2O_3$), about 30–40 parts granular aluminum hydroxide, about 0.01–0.1 part of a powdered hydrogen displacing metal, phosphoric acid in an amount equivalent to about 22–27 parts of 85% phosphoric acid aqueous solution, and about 8–14 parts water, said alumina, hydroxide, metal, and water first being mixed, said phosphoric acid thereafter being added and producing a foaming reaction between said acid and said alumina, hydroxide, and metal in which steam and hydrogen are evolved and impart a light cellular structure to a reaction mass, casting the reaction mass in a form and permitting said mass to set without the application of heat additional to that produced by the reaction, said setting being substantially complete within a period less than about one hour, and curing the set mass by heating to the range of about 200–600° F.

2. The method of claim 1 wherein said alumina and hydroxide are of 325 mesh size.

3. The method of claim 1 wherein the mixture also contains 0.01–0.1 part activated carbon.

4. The method of claim 1 wherein said curing is effected by heating the set mass to about 200° F. for two hours and then to a temperature in the range of about 400–600° F. for 2–28 hours.

5. The method which comprises, forming a mixture consisting essentially of about 25–31 parts by weight granular alumina, about 30–40 parts granular aluminum hydroxide, about 0.01–0.1 part of a powdered hydrogen displacing metal, phosphoric acid in an amount equivalent to about 22–27 parts of 85% phosphoric acid aqueous solution, and about 8–14 parts water, said alumina, hydroxide, metal, and water first being mixed and said phosphoric acid thereafter being added and producing a foaming reaction between said acid and said alumina, hydroxide, and metal in which steam and hydrogen are evolved and impart a light cellular structure to a reaction mass, casting the reaction mass in a form and permitting said mass to set without applying additional heat, and curing the set mass at a temperature in the range of about 200–400° F.

6. The method which comprises preparing a mixture consisting essentially of about 25–26 parts by weight of granular alumina, about 37–39 parts granular aluminum hydroxide, about 0.01 part powdered aluminum metal, about 9–13 parts water, and phosphoric acid in an amount equivalent to about 23–25 parts phosphoric acid in 85% aqueous solution, said alumina, hydroxide and aluminum metal first being mixed and wetted with said water, said phosphoric acid then being added, the addition of said acid thereby producing a foaming reaction in which steam and hydrogen are evolved which impart a light cellular structure to the reaction mass, permitting the mass to set, and hardening the resultant product by heating to a temperature in the range of about 200–600° F.

7. The method of claim 6 wherein the reaction mass is poured into a honeycomb panel and is set and hardened therein.

8. The method of claim 6 wherein the hardening is carried out at a temperature of about 200° F. for about 2–4 hours and thereafter at higher temperatures up to about 600° F. for a period of 16–32 hours.

9. The method of claim 6 wherein the hardening is carried out at a temperature of about 200° F. for about 2 hours and then at about 400° F. for about 2 hours.

10. The method which comprises, forming a mixture consisting essentially of about 30.5 parts by weight of granular alumina, about 30.5 parts granular aluminum hydroxide, about 0.01 part of powdered aluminum metal, about 25.6 parts of phosphoric acid in 85% aqueous solution, and about 12.2 parts water, said alumina, hydroxide, metal, and water first being mixed, and said phosphoric acid thereafter being added and producing a foaming reaction between said acid and said alumina, hydroxide, and metal in which steam and hydrogen are evolved and impart a light cellular structure to a reaction mass, casting the reaction mass in a form and permitting said mass to set without the application of heat additional to that produced by the reaction, said setting being substantially complete within a period less than about one hour, and curing the set mass at a temperature in the range of about 200–400° F.

References Cited by the Examiner
UNITED STATES PATENTS

| | | | |
|---|---|---|---|
| 2,116,910 | 5/1938 | Piccard | 106—85 |
| 2,868,294 | 1/1959 | Beale et al. | 106—85 |
| 2,966,421 | 12/1960 | Zimmerman et al. | 106—40 |

FOREIGN PATENTS

| | | |
|---|---|---|
| 521,694 | 5/1940 | Great Britain. |

TOBIAS E. LEVOW, *Primary Examiner.*